United States Patent [19]
Kashiwagi

[11] Patent Number: 6,019,931
[45] Date of Patent: Feb. 1, 2000

[54] METHOD OF MOLDING COMPOSITE INSULATOR AND METAL MOLDING APPARATUS USED FOR THIS MOLDING METHOD

[75] Inventor: Hiroshi Kashiwagi, Nagoya, Japan

[73] Assignee: NGK Insulators, Ltd., Japan

[21] Appl. No.: 08/996,187

[22] Filed: Dec. 22, 1997

[30] Foreign Application Priority Data

Dec. 27, 1996 [JP] Japan ................................. 8-350107

[51] Int. Cl.⁷ ........................... B29C 33/02; B29C 33/06
[52] U.S. Cl. ................... 264/496; 249/78; 264/271.1; 264/271.11; 264/328.16; 425/116; 425/174.4; 425/543; 425/548
[58] Field of Search ..................... 425/548, 116, 425/543, 174.4; 264/327, 496, 328.16, 271.1, 271.11, 328.2; 249/78; 174/178

[56] References Cited

U.S. PATENT DOCUMENTS

| | | | |
|---|---|---|---|
| 2,661,390 | 12/1953 | Gelpi | 174/178 |
| 3,971,128 | 7/1976 | Rebosio | 174/178 |
| 4,476,081 | 10/1984 | Kaczerginski et al. | 264/328.16 |
| 4,702,873 | 10/1987 | Kaczerginski | 264/263 |
| 5,648,132 | 7/1997 | Abe et al. | 425/190 |

FOREIGN PATENT DOCUMENTS

| | | | |
|---|---|---|---|
| 56-137915 | 10/1981 | Japan | 264/271.1 |
| 57-110409 | 7/1982 | Japan | 264/272.11 |
| 59-150716 | 8/1984 | Japan | 264/271.1 |
| 59-212212 | 12/1984 | Japan | 264/271.1 |
| 4-229215 | 8/1992 | Japan | 425/548 |

*Primary Examiner*—Robert Davis
*Attorney, Agent, or Firm*—Parkhurst & Wendell, L.L.P.

[57] ABSTRACT

A method of molding a composite insulator having a core member and an overcoat portion arranged on an outer surface of the core member, in which a core member having metal fittings at both ends thereof is set in a metal mold for molding the composite insulator, overcoat portion forming materials are filled in a cavity for molding said overcoat portion formed around the core member, and then the overcoat portion forming materials are cured by heat, is disclosed. The improved method includes a step of making a temperature increase of the overcoat portion forming materials near the metal fittings equal to that of the other portion, when the overcoat portion forming materials are cured by heat, by utilizing an additional heating means.

6 Claims, 4 Drawing Sheets

METHOD OF MOLDING COMPOSITE INSULATOR AND METAL MOLDING APPARATUS USED FOR THIS MOLDING METHOD

BACKGROUND OF THE INVENTION

1. Field of the Invention

The present invention relates to a method of molding a composite insulator utilizing a metal mold and a metal molding apparatus used for this molding method.

In the present invention, "composite insulator" has a core member made of fiber reinforced plastics and an overcoat portion made of insulation polymer materials arranged on an outer surface of the core member, and it means a wide concept including not only polymer insulator in which the core member is formed by an FRP solid member but also polymer hollow insulator or hollow SP insulator in which the core member is formed by an FRP cylindrical member. Moreover, the overcoat portion generally has a cylindrical sheath portion arranged on an outer surface of the core member and a plurality of sheds arranged on an outer surface of the sheath portion with a predetermined interval. Further, as insulation polymer materials, silicone rubber, ethylene-propylene copolymer (RPM), ethylene-propylene-diene copolymer (EPDM) and so on are preferably used.

2. Related Art Statement

One example of a known method of molding a composite insulator in described hereinafter. In the case of molding a polymer insulator by utilizing a metal mold, the polymer insulator is molded by setting with pressure a core member having for example flange metal fittings at both ends thereof, in the metal mold heated preliminarily at a predetemined temperature by: using a heating plate for example arranged outside of the metal mold, via a sheet made of overcoat portion forming materials such as silicone rubber; filing overcoat portion forming materials into a cavity for forming the overcoat portion i.e. sheath portion and sheds, the cavity being generated between the core member and the metal mold; and maintaining with pressure the sheet for a predetermined time interval. In this manner, the overcoat materials are cured and hardened, and an upper metal sold portion and a lower metal mold portion rich construct the metal mold are detached with each other so an to obtain the polymer insulator. In the example mentioned above, a compression molding method was explained. However, also in the another molding method such as an injection molding method and a transfer molding method, the heating method for curing overcoat forming materials is same while the overcoat forming material filling method is different.

FIG. 4 is a schematic view showing one embodiment of a metal molding apparatus used for performing the known method of molding a polymer insulator. In the embodiment shown in FIG. 4, a numeral 51 is a metal mold which is constructed by a pair of an upper metal mold portion and a lower metal mold portion. A core member 53 having flange metal fittings 52 at both ends is set in the metal mold 51. A cavity 54 for molding a sheath portion and sheds is formed between the metal mold 51 and the core member 53. In the cavity 54, overcoat portion forming materials 55 such as silicone rubber are filled. Heating plates 56 are arranged outside of the metal mold 51 and the metal mold 51 can be uniformly heated by the heating plates 56.

In the known molding method mentioned above, the flange metal fittings 52 having a large heat capacity are arranged at both ends of the core member 53, and the flange metal fittings 52 and the core member 53 are heated in the metal mold 51 at the same time during the molding step. Generally, this heating step is performed for a time interval during which the coat portion forming material 55 is sufficiently cured. In this time, the overcoat portion forming material 55 arranged at a portion near a center of the metal mold 51 is sufficiently cured, but the overcoat portion forming material 55 arranged at a portion near the flange metal fittings 52 is not sufficiently cured. If such an insufficient curing portion exists, there is a case that respective members are not connected sufficiently.

The present inventor investigated in detail the insufficient connection mentioned above. By the inventor's investigations, it was found that a temperature increase of a portion near the flange metal fitting 52 is low as cared with that of the other portion. From this point of view, various investigations were performed so as to uniformly cure the overcoat portion forming materials by making a temperature increase of the overcoat portion forming materials arranged at a portion near to the flange metal fitting 52 equal to that of the center portion.

At first, the inventor tried to make a heating time for the curing operation longer than the normal case in response to a low temperature increase of a portion near the flange metal fitting 52. However, in this case, a total curing time was increased. Therefore, it was found that such a total curing time increase was little for one molding operation but there was a large problem on the curing time if a large number of polymer insulators are molded in a large scale manufacturing. Then, the inventor tried to make a temperature increase of a portion near the flange metal fitting 52 faster, while the curing time was maintained normally, by making an overall temperature of the metal mold 51 higher than a normal curing temperature. However, in this case, it was found that a so-called scorch, in which a rough portion was generated on a surface of the product, occurred. Moreover, the inventor tried to make a preliminarily heating temperature of the flange metal fittings 52 and the core member 53 higher than the normal preliminarily heating temperature, when the core member 53 with the flange metal fittings 52 was set in the metal mold 51. However, in this case, it was found that the core member 53 was softened and a handling of the core member 53 before the molding operation became very difficult.

SUMMARY OF THE INVENTION

An object of the invention is to eliminate the drawbacks mentioned above and to provide a method of molding a composite insulator and a metal molding apparatus used for this molding method, in which a molding and curing operation is finished in a short time without affecting a product and a product of high quality can be obtained.

According to the invention, a method of molding a composite insulator having a core member and an overcoat portion arranged on an outer surface of the core member, in which a core member having metal fittings at both ends thereof is set in a metal mold for molding said composite insulator, overcoat portion forming materials are filled in a cavity for molding said overcoat portion foamed around said core member, and then said overcoat portion forming materials are cured by heat, comprises: a step of making a temperature increase of said overcoat portion forming materials near said metal fittings equal to that of the other portion, when said overcoat portion forming materials are cured by heat, by utilizing an additional heating means.

Moreover, according to the invention, a metal molding apparatus used for the method of molding a composite insulator mentioned above, comprises: an additional heating means arranged at a portion in said metal mold near or faced to said metal fittings.

In the present invention, an additional heating means is arranged at a portion in the metal mold near or faced to the metal fittings, and the portion in the metal mold near or faced to the metal fittings is further heated in addition to a normal metal mold heating for the curing operation. Therefore, it is possible to make a temperature increase of the overcoat portion forming materials near the metal fittings, which in lower than that of the other portion in a conventional one, equal to that of the other portion. In this case, a molding and curing operation is finished in a short time without adversely affecting a product and an excellent product can be obtained.

DESCRIPTION OF THE PREFERRED EMBODIMENTS

Figure 1:
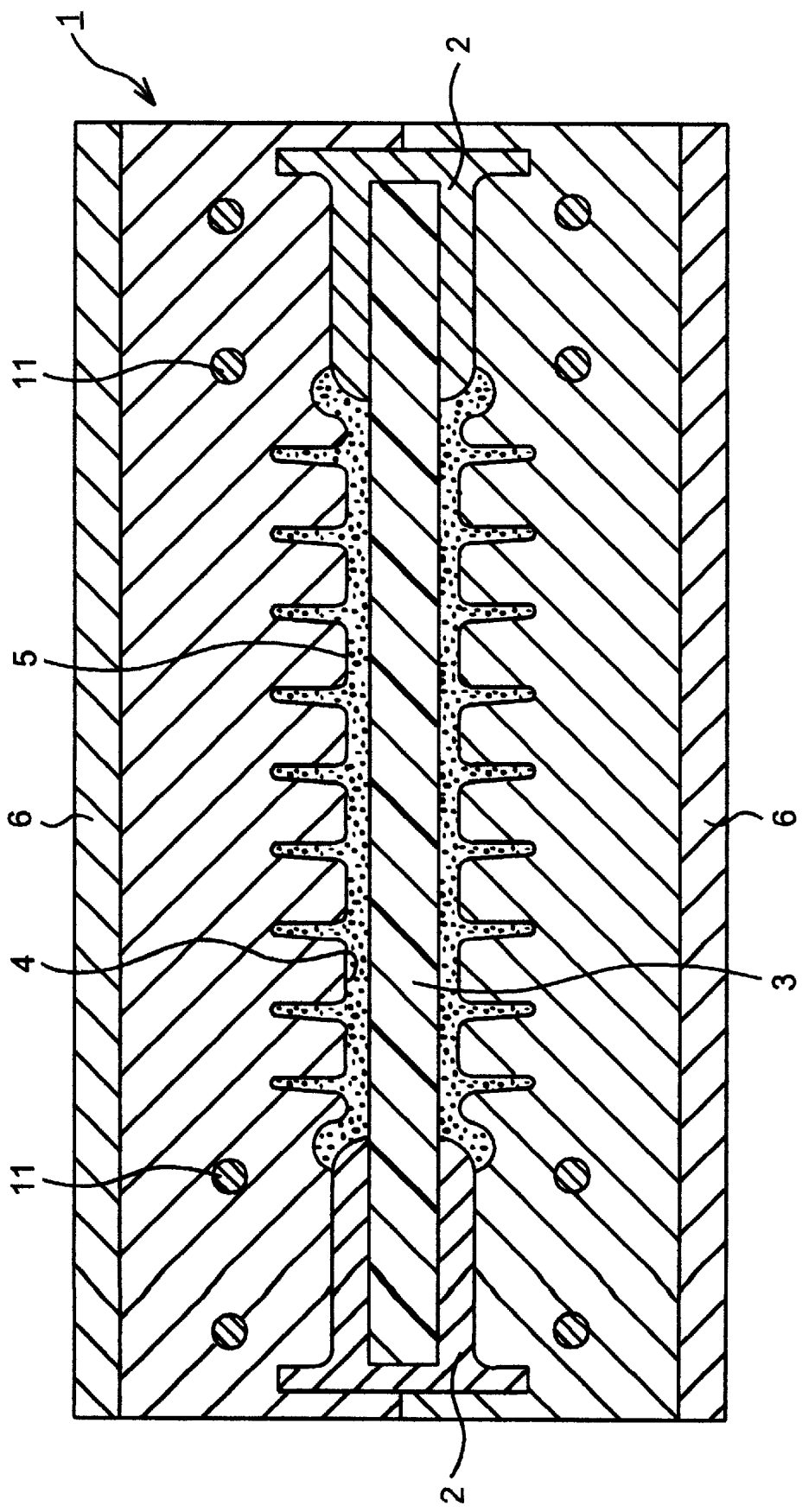
FIG. 1 in a schematic view for explaining one embodiment of a metal molding apparatus having an additional heater which performs a method of molding a composite insulator according to the invention.

FIG. 1 is a schematic view for explaining one embodiment of a metal molding apparatus which performs a method of molding a composite insulator according to the invention. In the embodiment shown in FIG. 1, 1 is a metal mold which is constructed by an upper metal mold portion and a lower metal mold portion. A core member 3 having flange metal fittings 2 at both ends is set in the metal mold 1. A cavity 4 for molding a sheath portion and sheds is ford between the metal mold 1 and the core member 3. In the cavity 4, overcoat portion forming materials 5 such as silicone rubber are filled. Heating plates 6 are arranged outside of the metal mold 1 and the metal mold 1 can be uniformly heated by the heating plates 6. The construction mentioned above in the same as that of the known embodiment.

In this embodiment, an important feature is that, additional heaters 11 are arranged at a portion in the metal mold 1 near the flange metal fittings 2 provided at both ends of the core member 3 under a condition such that the core member 3 having the flange metal fittings 2 is set in the metal mold 1. That is to say, four additional heaters 11 are arranged in the upper metal mold portion and the lower metal mold portion respectively. In the embodiment shown in FIG. 1, a cartridge heater having a stuck shape, which is on the market, is used as the additional heater 11. Moreover, setting holes are constructed at predetermined positions in the metal mold 1, and the cartridge heaters are arranged in the setting holes. Then, in addition to a heating of the overall metal mold 1 by the heating plate 6, heating energy is additionally applied to the flange metal fitting 2 directly or a portion near the flange metal fitting 2 by eight additional heaters 11. In this manner, a temperature increase of the overcoat portion forming materials near the flange metal fittings 2 becomes equal to that of the other portion. Therefore, it is possible to sufficiently cure the overcoat portion forming materials near the flange metal fittings 2, even if the curing time is the same as that of the other portion. In this respect, according to the known example, since a temperature increase of the overcoat portion forming materials near the flange metal fittings is slow, the overcoat portion forming materials are not cured sufficiently if the curing time in the same as that of the other portion. Moreover, since a temperature of the core member 3 corresponding to the metal mold 1, except for the portion near the flange metal fittings 2, is the same as the normal curing temperature, it is possible to eliminate a generation of scorch or the like.

In the embodiment shown in FIG. 1, the upper metal mold portion and the lower metal mold portion, which construct the metal mold 1, are integral respectively. However, respective upper metal mold portion and lower metal mold portion may be formed by a plurality of segments which correspond to each shed. Moreover, in the embodiment shown in FIG. 1, the flange metal fittings 2 are arranged at both ends of the core member 3. For example, in the case of LP insulator in which one and is fixed and the other end supports a power supply line, the flange metal fitting 2 may be arranged at only one end of the core member 3 and a support metal fitting may be arranged at the other end of the core member 3. Further, since the feature of the present invention is that the overcoat portion forming materials near the flange metal member 2 is additionally heated by the additional heaters 11, a method of supplying the overcoat portion forming materials into the cavity 4 is not limited. Therefore, all the molding methods such as compression molding method, injection molding method, and transfer molding method can be applied to the present invention.

Figure 2:
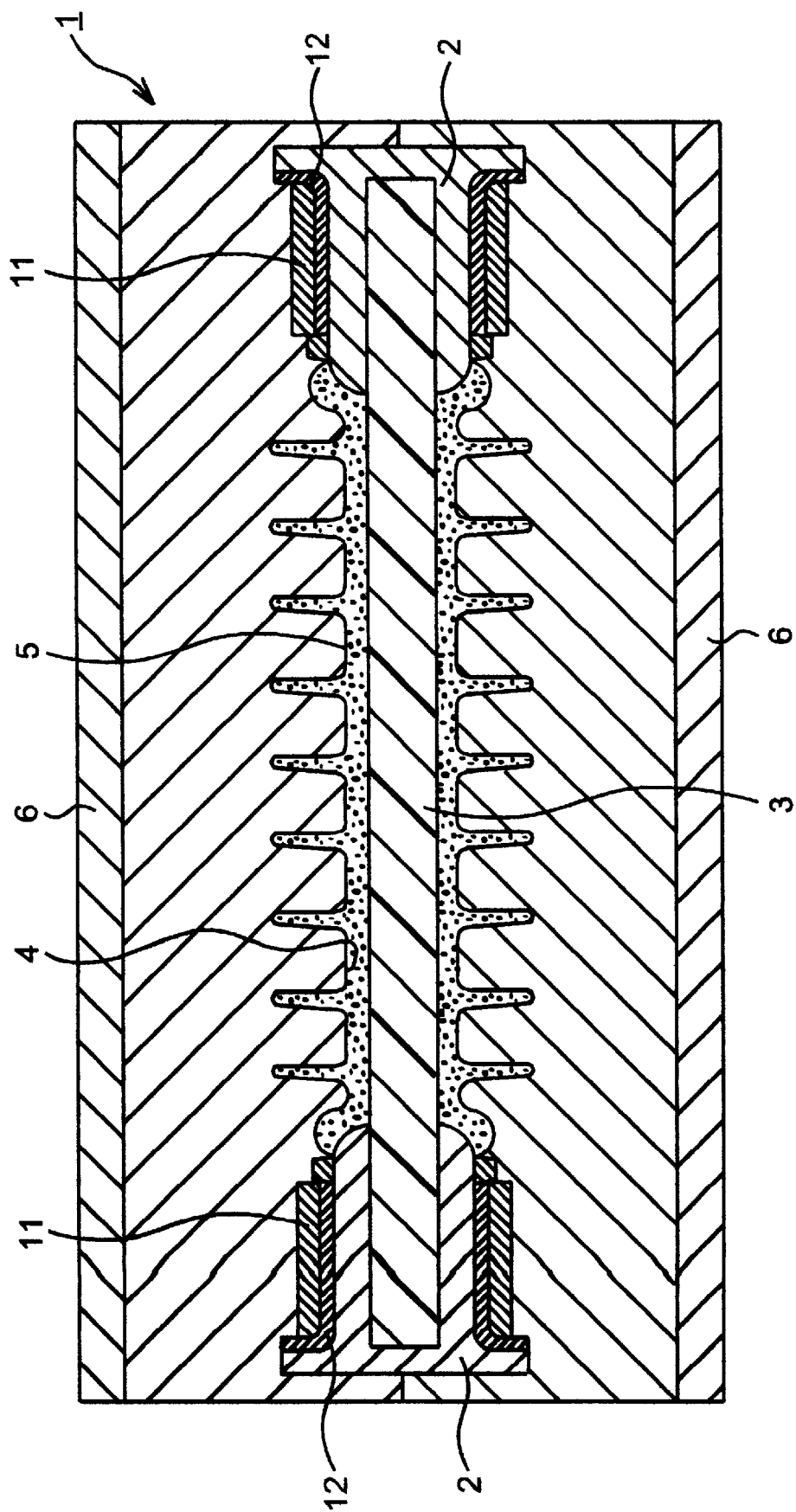
FIG. 2 is a schematic view showing another embodiment of a metal molding apparatus having another additional heater which perform the method of molding a composite insulator according to the invention.

FIG. 2 is a schematic view showing another embodiment of a metal molding apparatus having another additional heater according to the invention. In the embodiment shown in FIG. 2, portions similar to those of FIG. 1 are denoted by the same reference numerals and the explanations thereof are omitted herein. In the embodiment shown in FIG. 2, a small space 12 exists between the flange metal fitting 2 and the metal mold 1, and thus a heat conduction from the metal mold 1 to the flange metal fitting 2 is prevented. Therefore, in the embodiment, an additional heater 11 with a plate shape having a radiation property is arranged at a portion in the metal mold 1 faced to the flange metal fitting 2 under a condition such that the additional heater 11 is not brought into contact with the flange metal fitting 2. As the additional heater with a plate shape having a radiation property, ceramic heater, far-infrared heater and so on can be utilized.

In the embodiments shown in FIG. 1 and FIG. 2, when silicon rubber of a high temperature vulcanizing (HTV) type is used as the overcoat portion forming materials 5, one example of temperatures at respective portions is as follows. That is to say, a metal mold temperature for maintaining the overall metal mold 1 by the heating plate 6 is 170° C.±2° C. Moreover, a metal mold temperature near the flange metal fitting 2, to which an effect of the additional heater 11 is applied, is 173°–174° C. Therefore, this metal mold temperature near the flange metal fitting 2 is a little higher than that of the product center portion.

Hereinafter, an actual example will be explained.

EXAMPLE

Figure 3:
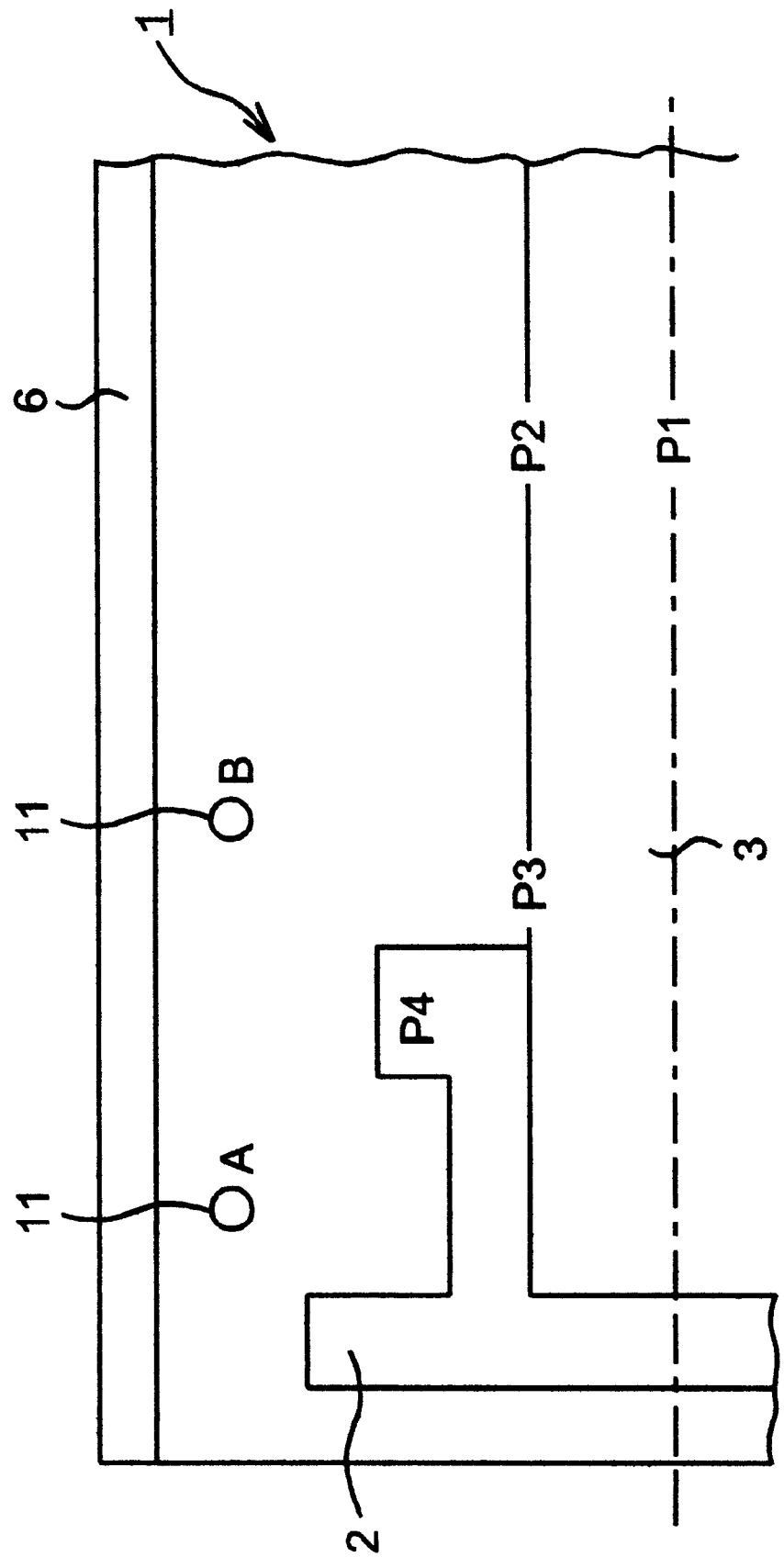
FIG. 3 is a schematic view for explaining temperature measuring positions in the embodiment according to the invention.
Figure 4:
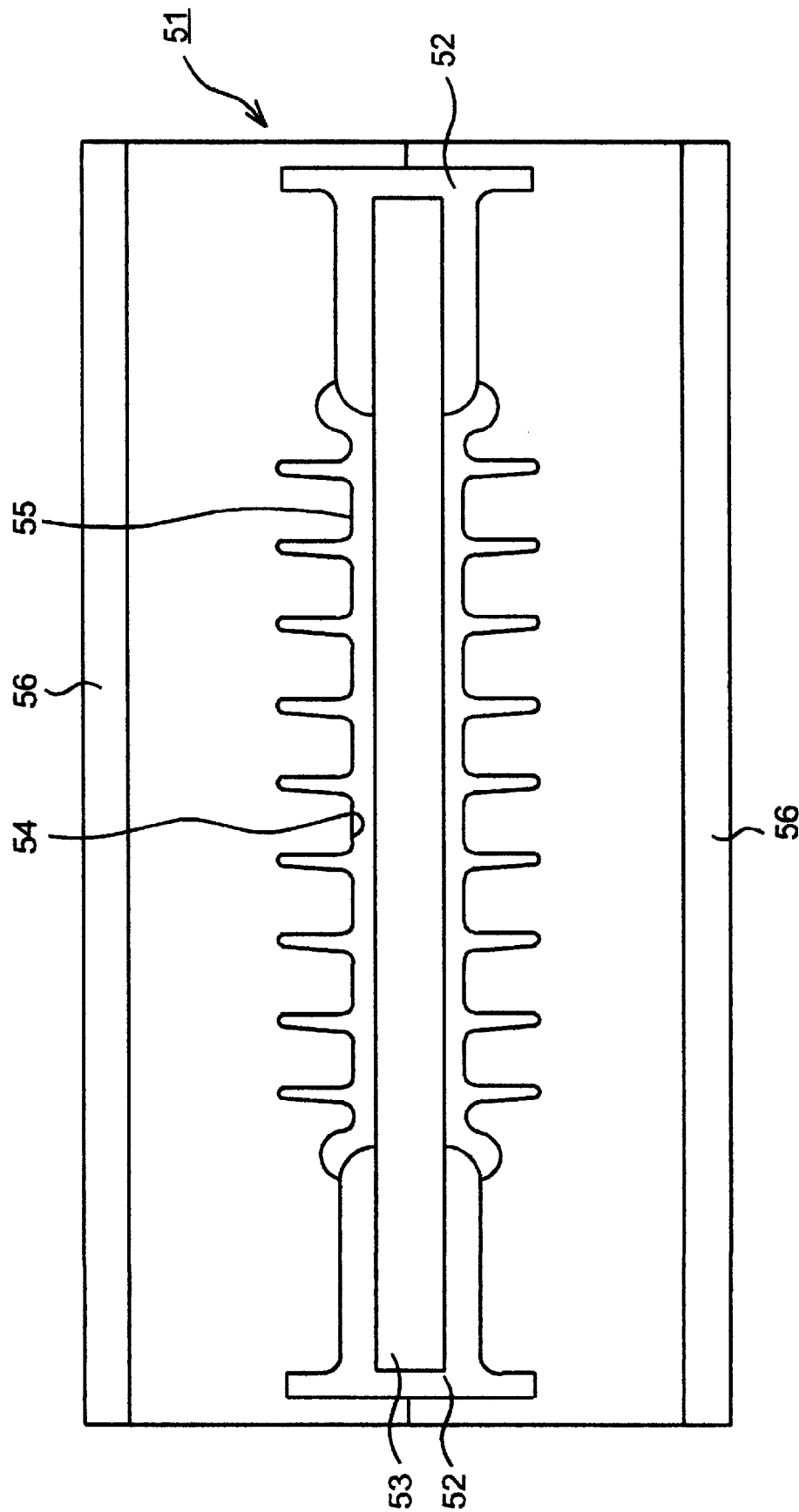
FIG. 4 is a schematic view for explaining one embodiment of a method of molding a composite insulator according to a known one.

As shown in FIG. 3, the metal mold 1 according to the invention in which the additional heaters 11 were arranged at positions A and B therein near the flange metal fitting 2 and a metal old according to a comparative example in which no additional heater was arranged were prepared. In the prepared metal molds according to the invention and the comparative example, thermocouples were embedded in the core member 3 at positions P1–P3, and also a thermocouple was embedded in the flange metal fitting 2 at a position P4. Then, temperatures at the positions P1–P4 were measured when the overcoat portion forming materials made of silicon rubber was heated. In all the cases, the molding operation was started at a metal mold temperature of 170° C., and, in the case that the additional heater was used, setting temperatures of the additional heaters were 180° C. and 175° C. Moreover, in all the cases, the core member 3 made of FRP and the flange metal fitting 2 were preliminarily heated at 100° C. for 2 hours. Then, temperatures at respective positions when 15 minutes elapsed and a time duration till the position P3 reached to 160° C. were measured. Further, conditions of the metal fitting connection, i.e. whether a curing connection between the metal fitting and rubber is possible or not, after the curing operation wan performed for 20 minute was measured and indicated as ○ (curing operation is possible) or X (curing operation is impossible) . The results were shown in Table 1.

TABLE 1

| Molding condition | | Temperatures at respective positions when 15 minutes elapse | | | | Time duration till position 3 reaches to 160° C. | Condition of metal fitting connection after 20 minutes curing |
| --- | --- | --- | --- | --- | --- | --- | --- |
| Metal mold temperature | Additional heater, temperature | 1 | 2 | 3 | 4 | | |
| 170° C. | no-use | 117 | 161 | 145 | 158 | 28 (MIN) | x |
| 170° C. | no-use | 118 | 166 | 147 | 162 | 27 | x |
| 170° C. | use, 180° C. | 121 | 167 | 158 | 174 | 16 | ○ |
| 170° C. | use, 175° C. | 122 | 168 | 154 | 173 | 18 | ○ |

From the results shown in Table 1, it was found that the excellent product in which a temperature increase of silicone rubber near the flange metal fitting 2 was not slow and no problem on the curing operation and the connecting operation occurred.

As mentioned above, according to the invention, since an additional heating means in arranged at a portion in the metal mold near the metal fittings, and the portion in the metal mold near the metal fitting is additionally heated in addition to a normal metal mold heating for the curing operation, it in possible to make a temperature increase of the overcoat portion forming materials near the metal fittings, which is normally lower than that of the other portion in a conventional one, equal to that of the other portion. In this case, a molding and curing operation is finished in a short time without adversely affecting a product and an excellent product can be obtained.

What is claimed:

1. A method of molding a composite insulator having a core member and an overcoat portion arranged on an outer surface of the core member, in which a core member having metal fittings at both ends thereof is set in a metal mold for molding said composite insulator, overcoat portion forming materials are filled in a cavity for molding said overcoat portion formed around said core member, and then said overcoat portion forming materials are cured by heat, comprising: a step of making a temperature increase of said overcoat portion forming materials near said metal fittings equal to that of the other portion, when said overcoat portion forming materials are cured by heat, by utilizing an additional heating means.

2. The method according to claim 1, wherein a heater is arranged at a portion in said metal mold near said metal fittings, as said additional heating means.

3. The method according to claim 1, wherein said additional heating means is a radiation heater located at a portion in said metal mold facing said metal fittings.

4. A metal molding apparatus for forming a uniformly cured composite insulator, which insulator includes a core member and an overcoat portion arranged on an outer surface of the core member, in which the core member has metal fittings at both ends thereof, comprising:

a metal mold shaped to form a mold cavity;

heating means for said metal mold and external to said metal mold; and, additional heating means within said metal mold near a location for metal fittings.

5. The metal molding apparatus according to claim 4, wherein said additional heating means is a cartridge heater.

6. The metal molding apparatus according to claim 4, wherein said additional heating means is a radiation heater located at a portion in said metal mold facing said metal fittings.

* * * * *